United States Patent [19]

Miller

[11] Patent Number: 4,963,371

[45] Date of Patent: Oct. 16, 1990

[54] METHOD FOR MAKING A SOLID ANIMAL FEED SUPPLEMENT

[75] Inventor: Alex E. Miller, Placentia, Calif.

[73] Assignee: Union Oil Company of California, Los Angeles, Calif.

[21] Appl. No.: 96,281

[22] Filed: Sep. 10, 1987

Related U.S. Application Data

[63] Continuation of Ser. No. 634,168, Jul. 25, 1984, abandoned.

[51] Int. Cl.⁵ .......................... A23K 1/02; A23K 1/22
[52] U.S. Cl. ........................................ 426/69; 426/72; 426/74; 426/519; 426/520; 426/649; 426/656; 426/658; 426/807
[58] Field of Search ...................... 426/72, 656, 69, 74, 426/623, 626, 630, 636, 658, 807, 649, 519, 520

[56] References Cited

U.S. PATENT DOCUMENTS

| | | |
|---|---|---|
| 2,991,179 | 7/1961 | Kviesitis et al. . |
| 3,121,634 | 2/1964 | Kichline et al. . |
| 3,165,413 | 1/1965 | Weber et al. .................... 426/658 X |
| 3,246,336 | 4/1966 | Baribo et al. . |
| 3,420,672 | 1/1969 | Appleman . |
| 3,720,522 | 3/1973 | Nakagami . |
| 3,794,740 | 2/1974 | Achorn et al. . |
| 3,988,483 | 10/1976 | Deyoe et al. . |
| 4,027,043 | 5/1977 | Schroeder et al. ............. 426/807 X |
| 4,055,667 | 10/1977 | Linton et al. . |
| 4,062,988 | 12/1977 | De Santis et al. ............. 426/807 X |
| 4,160,041 | 7/1979 | Schroeder et al. ............. 426/807 X |
| 4,171,385 | 10/1979 | Skoch et al. .................... 426/623 X |
| 4,171,386 | 10/1979 | Skoch et al. . |
| 4,221,818 | 9/1980 | Schroeder ....................... 426/807 X |
| 4,234,608 | 11/1980 | Linehan ........................... 426/807 X |
| 4,265,916 | 5/1981 | Skoch et al. . |
| 4,376,790 | 3/1983 | Ames . |
| 4,382,966 | 5/1983 | Mickus et al. . |

FOREIGN PATENT DOCUMENTS

| | | |
|---|---|---|
| 263695 | 6/1964 | Australia . |
| 438073 | 1/1972 | Australia . |
| 460390 | 8/1973 | Australia . |
| 170505 | 3/1974 | New Zealand . |
| 1356954 | 6/1974 | United Kingdom . |

OTHER PUBLICATIONS

Grosso et al., Calcium Chloride in Liquid Feed Supplements NFIA Counter,'73 Oct. 1973, pp. 115–129.

R. B. Keyser, C. H. Noller, L. J. Wheeler, D. M. Schaefer, "Characterization of Limestones and Their Effects in Vitro and in Vivo in Dairy Cattle," *Journal of Dairy Science*, vol. 68, pp. 1376–1389 (1985).

A. M. Kovacik, S. C. Loerch, B. A. Dehority, "Effect of Supplemental Sodium Bircarbonate on Nutrient Digestibilities and Ruminal pH Measured Continuously, " *Journal of Animal Science*, vol. 62, pp. 226–234 (1986).

(List continued on next page.)

*Primary Examiner*—R. B. Penland
*Attorney, Agent, or Firm*—Gregory F. Wirzbicki; Shlomo R. Frieman

[57] ABSTRACT

A molasses-based liquid animal feed supplement including a nutritionally appropriate phosphorus content is hardened into a solid form by the addition of a small amount of a soluble calcium compound, e.g., calcium chloride. The disclosed solid animal feed supplement is sufficiently palatable to permit its free choice feeding and contains sufficient molasses to help meet the energy requirements for maintenance and weight gain of grazing animals. The solid animal feed supplement is prepared by mixing the ingredients to provide a solution having a critical pH, in the range of from 2.7 to 4.5, to permit the in-situ reaction of an orthophosphate compound and a calcium compound. Within this critical pH range, the solution quickly hardens into a solid molasses block having a hardness of 80 or less (i.e. in 0.1 mm Penetrometer units). To avoid requiring excess calcium ion to effect hardening, the ingredients are, preferably, mixed in the absence of added sulfate ion and calcium sequestrants.

126 Claims, 5 Drawing Sheets

OTHER PUBLICATIONS

M. Poos-Floyd, "Evaluation of Sodium Sesquicarbonate vs Sodium Bicarbonate for Dairy Cows Fed Corn Silage Based Diets in Early Lactation," University of Massachusetts, Amherst, Mass., Nov. 14, 1984.

Brochure from FMC Corporation, Philadelphia, Pa., "Introducing A New Dairy Feed Buffer: S-Carb TM Feed Additive," 1984.

Brochure from Combustion Engineering, Inc., Cleveland, Ohio, "A Dairy Ratio Necessity," describing MAGOX® magnesium oxide.

C. L. Davis, "The Use of Buffers in the Rations of Lactating Dairy Cows," paper presented at symposium, Regulation of Acid-Base Balance, Tucson, Ariz., Nov. 8-9, 1978.

R. S. Emery, "High Energy Feeds for Milk Production," paper presented at symposium, Buffers in Ruminant Physiology and Metabolism, Tucson, Ariz., Oct. 23-24, 1975.

K. A. Cummings and R. W. Russell, "Effects of Feeding Whole Cottonseed to Lactating Cows on Glucose and Palmitate Metabolism," *Journal of Dairy Science*, vol. 68, pp. 2009-2015 (1985).

Brochure from Eastman Kodak Company, Kingsport, Tenn., "Eastman IsoPlus TM Nutritional Supplement," 1984.

A. M. Papas, S. R. Ames, R. M. Cook, C. J. Sniffen, C. E. Polan, L. Chase, "Production Responses of Dairy Cows Fed Diets Supplemented with Ammonium Salts of ISO C-4 and C-5 Acids," *Journal of Dairy Science*, vol. 67, pp. 276-293 (1984).

Takeshi, Mike et al., "Dehydration of Molasses", *Chemical Abstracts*, vol. 70, 1969, p. 104 (79348W).

Gottfried, et al., *Industrial and Engineering Chemistry*, 44, (1): 141-145 (1952).

*Beet-Sugar Technology*, McGinnis Editor, Beet-Sugar Development Foundation, Fort Collins, Colo., (1951), pp. 166-167, 555-556, and 559-573.

METHOD FOR MAKING A SOLID ANIMAL FEED SUPPLEMENT

This application is a continuation of application Ser. No. 634,168, filed July 25, 1984, now abandoned.

BACKGROUND OF THE INVENTION

1. Field of the Invention

This invention relates to a method for making an animal feed supplement and, in particular, a molasses-based animal feed supplement in solid, block form.

2. Brief Description of the Prior Art

The value of molasses-containing supplements as a palatable carbohydrate source and nutrient vehicle in animal diets has been recognized for many years. Phosphoric acid has often been added to the molasses supplement to serve as a preservative and as a source of dietary phosphorus. Urea has been added to animal feed supplements to supply nonprotein nitrogen, and fats and vitamins have also been included as ingredients in animal feed supplements. Molasses-based feed supplements are particularly valuable fed either "free-choice" to grazing cattle or in confinement where feed mixing facilities are lacking. (Free-choice feeding allows the animal to consume from a conveniently placed reservoir of liquid or solid supplement according to need.) To control consumption during free-choice feeding, physical controls (e.g. by use of a lick wheel or by varying the hardness of a feed block) and/or chemical controls (e.g. palatability) may be used.

Solid animal feed supplements have been prepared from molasses and other ingredients to augment the dietary requirements of animals, especially cattle, when forage is scarce or of low quality, i.e., during the summer months in California and summer through winter in the Pacific Northwest. Solid feed blocks offer the advantage of free choice feeding of cattle, thereby reducing the labor and expense otherwise incurred to mix the feed supplement with the cattle's feed ration. An additional advantage of solid blocks, containing molasses, is that transportation of molasses to remote locations is easier. Molasses blocks have been manufactured by compressing ingredients into a molded shape or by evaporative heating of the ingredients. Both of these methods have certain disadvantages. For example, energy-supplying ingredients, such as molasses, and heat-sensitive vitamins (if added) may degrade during heating at the temperature necessary to evaporate water.

In U.S. Pat. No. 4,027,043, animal feed supplements are disclosed which are prepared by mixing a phosphate source and an aluminum or an alkaline earth metal ingredient with molasses to solidify the resultant mixture. This patent discloses that the combination of a soluble phosphate or phosphoric acid, at from 0.5 to 5 weight percent $P_2O_5$, and an oxide or salt of aluminum, magnesium, calcium or mixture thereof, at from 0.5 to about 5 weight percent (expressed as the oxide) will solidify molasses. This reference does not recognize that the rate of hardening and the ultimate hardness does not increase significantly beyond the range of from 1 to 2 percent, by weight, calcium and 1 to 2 percent, by weight, phosphorus, nor the fact that the amount of phosphorus greater than about 2 percent by weight is not economic, as it is in excess of nutritional needs of animals such as cattle. Moreover, this reference does not recognize that the rate of solidification and the ultimate hardness of the resulting blocks is pH dependent, or that the optimum rate of solidification (or hardening) and block hardness occurs in a very narrow pH range. Nor does this reference recognize that the extent of hardening of cane molasses and beet molasses-based products (cane molasses and beet molasses are two of the most preferred molasses for use in animal feed supplements) varies greatly with pH.

The use of calcium chloride in liquid molasses-based supplements for cattle has been investigated by Grosso and Nelson. (See "Calcium Chloride in Liquid Feed Supplements" reported in complete texts of the speeches given at the 1973 annual convention, NFIA-COUNTER '73, Oct. 14–16, 1973, Louisville, KY.) The object of these investigators was to provide high soluble calcium content liquid supplements and avoid solidification; nevertheless, some of the formulations they prepared did solidify. The formulations that did solidify generally did not have a nutritionally appropriate amount of phosphorus, i.e., they contained either too much or too little phosphorus. Certain of the other formulations that had nutritionally appropriate amounts of phosphorus did not harden since the phosphorus was supplied as a polyphosphate which (as will be discussed below) does not interact with calcium ions to provide a solid product at the nutritionally appropriate calcium and phosphorus concentrations or at convenient temperature and mixing conditions.

In view of the above, it is clear that it would be desirable to have a method for preparing solid, molasses-based animal feed supplements, having a nutritionally appropriate phosphorus content, that does not suffer from the difficulties of the prior art methods discussed above.

Therefore, it is one object of this invention to provide an improved process for preparing solid, molasses-based animal feed supplements using the equipment and temperatures available to small distributors of cattle feed.

Another object is to provide a method for forming solid, molasses-based animal feed supplements which is of such simplicity that molasses can readily be converted into a solid product at any place at which liquid molasses is available.

Another object is to reduce the cost of molasses-based animal feed supplements by reducing or eliminating expenses incident to the handling and transportation of liquid products to the point of use, i.e., the feeding range.

Another object is to eliminate the requirement for accurate measuring of the ingredients required in the prior art method of making solid, molasses-based animal feed supplements by mixing a phosphate source with an aluminum or alkaline earth metal ingredient.

Further objects and advantages are to provide improved steps, elements, and arrangements thereof in a method effective in accomplishing the intended purposes.

Other objects and advantages of the instant invention will become apparent from a careful reading of the specification below.

SUMMARY OF THE INVENTION

This invention provides a method for making a solid, molasses-based animal feed supplement having a nutritionally appropriate concentration of phosphorus. (The nutritionally appropriate concentration for phosphorus is in the range of from 1 to 2 weight percent phosphorus based on the consumption of from 1 to 2 lbs of feed supplement per day.) In this method, molasses, e.g., cane molasses, beet molasses, corn (starch) molasses, wood molasses, etc. is combined with an orthophosphate compound, i.e., a compound containing little or no condensed or poly-phosphate species, e.g., phosphoric acid, ammonium phosphate, mono-and disodium phosphate, calcium dihydrogen phosphate, etc., to provide a phosphorus-containing molasses solution which is reacted under moderate to mildly severe agitation conditions, and preferably at a temperature of from 60° to 110° F., with a calcium compound soluble therein to provide a reactant solution comprising from 1 to 2 percent phosphorus (using an orthophosphate compound) and 1 to 2 percent calcium, by weight. The pH of the reactant solution is adjusted (if necessary) to a value within a critical range of from 2.7 to 4.5 with a basic material, e.g., aqueous ammonia, or with an acid material, e.g., acetic acid or hydrochloric acid, by adjusting the pH of the phosphorus containing molasses solution to a value, whereupon mixing with the calcium compound, the resulting reactant solution is within the critical pH range. (The more basic sources of phosphorus such as disodium hydrogen phosphate may require acid adjustment of the pH; however, the combination of the other listed phosphorus sources with molasses will usually provide a phosphorus-containing molasses solution either not requiring pH adjustment or requiring adjustment with a base.)

The calcium compound is preferably predissolved in a molasses solution for easier mixing. In this instance, the pH of the phosphorus-containing molasses solution will be adjusted to provide a reactant solution within the above critical pH range when the two molasses solutions are combined. After agitating for about 10 seconds to about 5 minutes, the agitation is terminated and the resulting molasses solution is allowed to harden. The solution becomes viscous even during mixing and is firm to the touch within a few hours. Within 1 to 5 days the solution solidifies to a hardness of 80 or less (as determined by standard grease cone penetrometer in units of 0.1 mm) at which hardness it is easily handled and transported. The solution may be allowed to harden in the mixing container, e.g., a cardboard drum, or may be poured into another suitable mold for hardening or curing into a cube or a cylinder. Additional ingredients such as salt (NaCl); protein meals; nonprotein nitrogen, e.g., urea, biuret, ammonium salts; fat; vitamins; trace minerals; medicaments; etc. may be incorporated into the resulting solid, molasses-based animal feed supplement by adding such ingredients to the molasses solution prior to hardening.

DETAILED DESCRIPTION OF THE INVENTION

It has now been unexpectedly discovered that in a method for making a solid, molasses-based animal feed supplement, having a nutritionally appropriate phosphorus content, e.g., from 1 to 2 percent phosphorus by weight, and a hardness that is convenient for handling, e.g., 80 penetrometer units (0.1 mm units), or less, by reacting a phosphorus-containing molasses solution with a calcium compound under conditions of agitation, an improved rate of hardening and ultimate hardness, at ambient temperature conditions, e.g., from about 60° to about 110° F., is obtained by adjusting the pH of the reactant solution to within the range of 2.7 to 4.5. Solidification results, at least in part, from the formation of a calcium phosphate gel structure. It has been unexpectedly discovered that, at a pH of less than about 2.7, both the rate of hardening and the ultimate hardness is much less than at a pH of from about 2.7 to 4.5. At a pH of more than 4.5, e.g., 5.0 to 7.0, hard blocks are not obtained with most molasses sources. In contrast to other molasses solutions, the rate of hardening and the ultimate hardness of cane molasses-based animal feed supplements continues to be good over the wide range of from 3.0 to about 7.0; however, the viscosity of a mixture of the phosphorus-containing cane molasses solution and the calcium compound is so great, in the range of from 4.5 to 7.0, that a uniform mixture cannot be obtained with simple mixing techniques available in the field. Preferably the pH of a reactant solution, incorporating beet molasses, will be adjusted to within the range of 2.7 to 3.3 to obtain the ultimate in hardness and rate of hardening.

Increasing the concentration of phosphorus and calcium within the range of from 1 to 2 percent will increase both the rate of hardening and the ultimate hardness of the molasses blocks. Therefore, preferably both the concentration of calcium and phosphorus are within the range of 1.5 to 2.0 weight percent. It is especially important to utilize the above preferred range when the total solids content of the molasses-based animal feed supplement is low as when, for example, a low BRIX molasses is utilized as the molasses source.

Molasses is commercially available as an aqueous solution having a solids content rated at about 60 to 90 BRIX and a consistency varying from a thin to a thick syrup. While molasses from different sources may differ in both the identity and amount of non-sugar and colloidal materials contained therein (such non-sugar and colloidal materials may coprecipitate or form solution aggregates with the calcium phosphate gel and thereby contribute to both the rate of hardening and the ultimate hardness), the molasses utilized in the method of the instant invention may be any sugar-containing molasses, such as cane or blackstrap molasses, beet molasses, corn molasses, wood sugar molasses, citrus molasses, and the like. Preferably, molasses of higher solids concentration e.g., from 75 to about 90 BRIX, is utilized since higher solids increases the ultimate hardness of the blocks or requires less phosphorus and calcium to obtain equivalent hardness. The most preferred molasses is cane or beet, since these are the most abundant molasses available in commerce. The method of this invention may also be used to solidify other aqueous sugar solutions, such as refined sugar syrups, although the lack of active non-sugar and colloidal material in such aqueous sugar solutions may make solidification less effective than with molasses.

The phosphate compound which is used to adjust the phosphorus content of molasses to provide the phosphorus-containing molasses solution may be any suitable feed-grade, water-soluble phosphate or phosphoric acid which has a simple phosphate group, i.e. an orthophosphate. Polyphosphates, i.e., compounds having more than one phosphate group condensed per molecule, have been found to hinder the rate of hardening and ultimate hardness of molasses solutions; therefore, polyphosphates are not suitable for the present invention. While not wishing to be bound by theory, it is believed that polyphosphate compounds sequester calcium ions and render them useless for hardening the phosphorus-containing molasses solution. Similarly, other calcium sequestrants, such as lactic and citric acid, as well as calcium precipitants, such as sulfate ion, should be avoided since they either sequester calcium ions or compete with the hardening or precipitation reaction of the calcium ions and the orthophosphate compound. (Additional calcium ions may be provided to compensate for the sequestered or precipitated calcium; however, this is economically inefficient.)

Useful phosphoric acids include electric furnace (white) phosphoric acid, or defluorinated wet-process (green) phosphoric acid, which can be of any commercially available grade such as the commonly available concentration range of from 50 to about 55 weight percent expressed as $P_2O_5$ corresponding to a concentration of orthophosphoric acid of about 70 to 75 weight percent. Examples of water-soluble phosphates which can be used are ammonium or alkali metal phosphates, such as mono- or diammonium orthophosphate, monopotassium orthophosphate, etc. Polyphosphoric acid can also be employed as a means to increase formula dry matter since it easily dissolves in molasses or in aqueous urea solutions or in any other aqueous solution that is to be added to the molasses provided sufficient time is allowed at low pH for hydrolysis to orthophosphate. The most preferred source of phosphate is orthophosphoric acid since it is an easily handled, high assay liquid and is a readily available item of commerce. Moreover, orthophosphoric acid provides an optimum pH with little or no adjustment. Finally, orthophosphoric acid functions as a preservative, fly-repellant, intake control agent, and is a buffering agent for ammonia produced during urea digestion by ruminant animals.

As discussed above, the orthophosphate compound is added to the molasses in an amount sufficient to provide from 1 to 2 percent, preferably 1.5 to 2 percent, by weight, phosphorus in the final solid product. Less than 1 percent phosphorus in the solid, molasses-based animal feed supplement is inadequate for a solid block formation and is marginal from a nutritional standpoint. Phosphorus content greater than about 2 percent exceeds cattle nutritional requirements, and therefore it is not nutritionally appropriate from an economic standpoint, to exceed 2 percent, by weight, phosphorus. Also the hardness of the solid molasses blocks produced by the method of this invention, is not increased appreciably by the excessive phosphorus.

In the preferred embodiment described below, the calcium compound is combined with the phosphorus-containing molasses solution, as a solution in molasses. Therefore, in this embodiment the orthophosphate is dissolved in a first molasses solution at a concentration higher than 2 percent by weight, and the excess phosphorus content will be diluted to the correct concentration by the calcium-containing molasses solution. For example, if equal volumes of the orthophosphate-containing molasses solution and the calcium-containing molasses solution are to be combined to provide a solid product, then from 2 to 4 percent, by weight, phosphorus will be dissolved in the first molasses solution.

The calcium compound should be soluble in molasses for best results. Therefore, water-soluble calcium salts are preferred for use in the method of this invention. Typically, calcium chloride, as well as the calcium salts of the lower molecular weight organic acids, e.g., calcium acetate, calcium propionate, etc. may be used, as well as other calcium-enriched products, e.g. calcium lignosulfonate, etc. Of the above calcium compounds, calcium chloride is the most preferred since this source of calcium ion is inexpensive and very soluble in water, aqueous urea solutions, and sugar syrups such as molasses. Mixtures of the above calcium salts are also conveniently used. The amount of calcium which is employed can be from about 1.0 to about 2.0 weight percent, of the solid molasses block of this invention, expressed as calcium, and preferably is from about 1.5 to 2.0 weight percent. Like the phosphorus content, the preferred calcium ion concentration, for rate of hardening and ultimate hardness, is dependent on the total solids of the molasses-containing animal feed supplement.

The calcium may be added to the phosphorus-containing molasses as an aqueous solution, e.g., 50 percent calcium chloride in water (brine) is a suitable source of calcium. The calcium may be added as a component of any other aqueous liquor that is to be added to the phosphorus-containing molasses solution, e.g. with the aqueous urea solution etc. With high shear input $CaCl_2$ might be incorporated in dry form, e.g., flakes. The high shear is required to disintegrate and disperse the solid $CaCl_2$. Preferably, for ease of mixing, the calcium is predissolved in molasses. Typically, a molasses solution containing from about 2 to about 4 percent calcium is made up for combining with an equal volume of a phosphorus-containing molasses solution. (Molasses may itself contain significant amounts of native calcium which may contribute to gelling and should be taken into account when calculating the amount of calcium desired in the presolution of calcium in molasses and in the final solid product.)

The pH of the reactant solution, i.e. the solution resulting from combining the phosphorus-containing molasses solution with calcium ion is adjusted to within the range of 2.7 to 4.5, and if beet molasses is utilized in the reactant solution, the pH is preferably adjusted to within the range of 2.7 to 3.3. The above pH is measured after homogeneously combining all of the ingredients utilized in the solid molasses blocks of this invention; however, it is critical that if the pH is to be adjusted with ammonia, that such adjustment be made prior to combining with calcium ions. Adding ammonia after calcium ions produces an inferior solid, molasses-based animal feed supplement, i.e. the local high alkalinity, prior to uniform dispersion, causes rapid precipitation rather than gel formation. Therefore if calcium chloride, either as a solid or as a aqueous solution is the source of calcium, the pH of the phosphorus-containing molasses solution is adjusted to a pH somewhat greater than the pH of the resulting reactant solution with ammonia. For example, the phosphorus containing molasses solution may be adjusted to a pH of from about 3.0 to about 6.0, prior to adding calcium chloride.

In the preferred method of combining calcium ion, pre-dissolved in molasses, with the phosphorus-containing molasses solution, the pH of the phosphorus-containing molasses solution is adjusted to provide a reactant solution having a pH within the above critical range upon combination of the two molasses solutions.

The optimum pH, within the range of from 2.7 to 4.5, will depend on the concentration of phosphorus and calcium, and the amount of dry matter in the mixture resulting in the solid molasses block. If the preferred orthophosphoric acid is utilized to provide phosphorus, the pH of the phosphorus-containing molasses solution may have to be raised with a base to provide a reactant solution having a pH within the critical range. Ammonia, either as an aqueous solution or anhydrous, is preferably used to adjust the pH, although other water-soluble bases, such as the alkali metal and alkaline earth metal hydroxides, e.g. NaOH, $Mg(OH)_2$, KOH, etc., may be used. Ammonia is preferred since it is a very inexpensive base and contributes to the protein equivalent of the resulting solid animal feed supplement by providing nitrogen.

The phosphorus-containing molasses solution is combined with calcium ions either with calcium ion predilution, i.e. predissolving calcium ions in molasses, or under conditions of vigorous agitation, so that the calcium is uniformly dissolved or dispersed in the molasses solution before interaction with the orthophosphate occurs. The result of nonuniform dispersion is a nonhomogeneous product which may have localized fluid and solid regions. Shearing agitation, as obtained with a Lightnin Mixer, is adequate to prepare small batches of the mixture of the phosphorus-containing molasses and calcium ions; however, prolonged shearing or remixing after 15 to 30 minutes standing should be avoided since the gel formed by the interacting orthophosphate ions and calcium ions may be disrupted prior to setting into a hard product.

Hand-mixing of small batches has been found to be adequate if the calcium is predissolved in a molasses solution. In general, mixing for 10 seconds to 5 minutes with a Lightnin Mixer or 1 minute to 5 minutes by hand is adequate to combine the phosphorus-containing molasses solution, with a solution of calcium ions predissolved in molasses, in a manner suitable for hardening into a solid product. If the calcium is added as a brine, e.g. 50 percent, by weight, $CaCl_2$ in water, more intense mixing may be required. It may be desirable to avoid the addition of water to the phosphorus-containing molasses solution to achieve increased hardness in the resulting solid molasses blocks. Thus, $CaCl_2$ (or other source of calcium ion) might be added as a solid or a very concentrated solution. In this embodiment, high shear mixing, as from a turbine or centrifugal pump or an in-line mixer, may be required. In a continuous operation an in-line mixer, e.g. a high speed rotor, inside a flow-through tube is suitable.

The phosphorus-containing molasses solution and the calcium ions may be mixed in the mold that will be used to form the solid product of this invention or the resulting mixture may be transferred to another mold(s). The mixture will thicken rapidly upon mixing and within 10 to 30 minutes, after the ingredients have been combined, the mixture should be transported into forms suitable for shaping of the mixture into the desired solid block form. Any size molds may be used, but for ease of handling manually, molds providing solid blocks of from 30 to about 100 pounds, preferably from about 50 to about 55 pounds, may be used. These blocks can be cylindrical, cubic or any other suitable shape. In a preferred embodiment, the thickening ingredients are transferred into corrugated cardboard boxes which are closed, sealed, and stored for a sufficient time to permit the liquid to solidify or cure, typically for a period from 1 to about 5 days. After solidification of the product, the resultant packages can be handled, e.g., palletized and the like, for shipment and storage.

The temperature at which the above phosphorus-containing molasses solution and the calcium ions are combined, as well as the temperature at which the resultant solution is cured, affects the hardening rate and the hardness of the final product. Preferably, the resulting mixture is agitated at a temperature of from 60° to 110° F., more preferably at from about 75° to about 110° F. A higher temperature, within the above range, will provide benefits for the mixing step of this invention, in two ways; therefore, the phosphorus-containing molasses solution (or any other solution used in the mixture) may be preheated to improve mixing. First the resulting decrease in the fluid viscosity of the mixture makes for better mixing. Second, the rate of hardening of the mixture is increased by increasing temperature. The preferred curing temperature will be in the same range as the mixing temperature; therefore, in colder climates the thickening liquid-containing molds may require storing in a heated area for curing.

The solid, molasses-based animal feed supplements prepared by the method of this invention will desirably include other nutritionally suitable ingredients. For example, fats and oils may be employed in the invention as a source of animal edible fat. The edible water-insoluble fats and oils from animal and vegetable sources (which can be liquids or solids at room temperature) may be included in the solid, molasses-based animal feed supplements of this invention. The solid compositions can contain from 2 to about 30, preferably from 5 to about 20, weight percent, edible fat. These fats include various fatty acids, such as stearic, palmitic, oleic, linoleic, lauric, etc., and the mono-, di-, or triglycerides of these fatty acids. Useful fats and oils can also include complex lipids, such as the phospholipids, e.g., fatty acid esters of glycerol phosphate or lecithins, which also contain nitrogen bases such as choline. The fats are commonly identified by source and suitable fats which can be employed include the oils, tailings, or refining residues of the following: soybean oil, cottonseed oil, sesame oil, olive oil, corn oil, tallow, fish oil, coconut oil, palm oil, etc. Preferably, relatively inexpensive sources of fats are employed, such as the yellow grease compositions, restaurant fats and greases, acidulated soap stocks or acidulated fats and oils. Such fats may also contain an antioxidant in an effective amount to inhibit oxidative degradation of the fat, e.g., from 0.01 to about 1 weight percent butylated hydroxyanisole, butylated hydroxytoluene, 4-hydroxymethyl-2, 6-di-tert butylphenol, etc.

An emulsifying agent in an amount suitable for stabilizing the composition and preventing the separation of the fat ingredient during manufacture of the product or weeping of the fat ingredient from the solid block after its formation can be employed at a concentration of from about 0 to about 2 weight percent. Preferred emulsifying agents are the colloidal clay gellants, e.g. attapulgite, bentonite, sepiolite, etc. which also function to increase the hardness of the solid product of this invention.

The solid, molasses-based feed supplement of this invention also may contain a nonprotein nitrogen source, such as ammonia, urea, biuret or mono- or diammonium phosphate to supply a part of the nitrogen dietary requirements for ruminants. (Note that ammonia may also be used for pH adjustment and ammonium phosphate may provide orthophosphate. These sources of nonprotein nitrogen are thus dual functional.) The preferred nonprotein nitrogen source is urea which can be added in an amount from about 1 to about 15 weight percent, preferably from about 5 to about 10 weight percent, based on the solid, molasses-based feed supplement of this invention. Generally, the feed supplement will contain no more than about 40 weight percent equivalent protein content from a nonprotein nitrogen source. Since the molasses also contributes from 1 to about 3 weight percent utilizable nitrogen, the maximum amount of urea or other nonprotein nitrogen source may be reduced by the amount of nitrogen contributed by the molasses.

Various trace nutrients, drugs, and vitamins can also be incorporated in the solid, molasses-based animal feed supplements of this invention including vitamins A, D, and E, tocopherols, as well as antioxidants for these materials, such as ethoxyquin (1, 2-dihydro-6-ethoxy-2, 2,4-trimethyl quinoline). Appropriate medicaments may be incorporated on an "as-needed" basis. The quantity and concentration of these medicaments must, of course, be in accord with established FDA regulations governing their use.

The following table sets forth the concentrations of the ingredients useful in the compositions of the instant invention:

TABLE I

| COMPONENT | CONCENTRATION[a] |
|---|---|
| 1. Molasses | 60–93 |
| 2. Fat | 0–30 |
| 3. Orthophosphate (as P) | 1–2 |
| 4. Calcium (as Ca) | 1–2 |
| 5. Emulsifier | 0–1 |
| 6. Starch, clay or other thickeners or gellants | 0–2 |
| 7. Equivalent Protein derived from non-protein nitrogen | 0–40 |
| 8. Trace Minerals, vitamins | 0–1 |
| 9. Salt (NaCl or KCl) | 0–10 |
| 10. Medicaments | (as approved) |
| 11. Basic or Acidic Materials for pH adjustment | (as required) |

[a]weight percent

The above ingredients are preferably combined with molasses or the calcium or orthophosphate-containing molasses prior to pH adjustment since certain of such ingredients will have pH effects of their own. Therefore, the order of addition should be considered on an individual basis.

The invention is further illustrated by the following examples which are illustrative of specific modes of practicing the invention and not intended as limiting the scope of the appended claims. Unless stated otherwise, the ingredients are in gram units and the percents are weight percents. Where a solution is referred to, it is understood that the solution is aqueous.

EXAMPLE 1

The hardness of molasses blocks of the instant invention is dependent on the orthophosphate and calcium ion concentration, the pH, the type and the source of the molasses, and the total dry matter or solids content. Hardness vs. pH dependencies for blocks of like or similar formulations or reactant solutions, comparing different sources of beet molasses are displayed in FIG. 1. All reactant solutions contain 1.5 percent phosphorus, 1.5 percent added calcium ions, 5 percent NaCl, and 5 percent urea the remainder being molasses. The reactant solutions are prepared by mixing equal weights of the calcium-containing molasses solutions with the phosphorus-containing molasses solutions of Table II. The pH of the reactant solution is varied by adjusting the pH of the phosphorus-containing molasses solution with $NH_3$ or HCl to yield the designated pH upon homogeneous mixing with the calcium-containing molasses solution. All reactant solutions are adjusted to provide equivalent Brix (based on the lowest

TABLE II

| | Sample | | | | |
|---|---|---|---|---|---|
| | A–C* | D | E | F | G |
| | Brix of Starting Molasses | | | | |
| | 81.0 | 79.6 | 78.6 | 77.1 | 74.0 |
| Phosphorus-Containing Molasses | | | | | |
| 50% Urea Solution | 10.0 | 10.0 | 8.3 | 5.6 | — |
| Dry Urea | — | — | 0.8 | 2.2 | 5.0 |
| Phosphoric Acid 0-56-0 | 11.8 | 11.8 | 11.8 | 11.8 | 11.8 |
| Beet Molasses | 66.1 | 66.7 | 68.2 | 69.6 | 72.4 |
| Salt | 10.0 | 10.0 | 10.0 | 10.0 | 10.0 |
| Water | 1.3 | 0.7 | — | — | — |
| Calcium-Containing Molasses | | | | | |
| 50% Urea Solution | 10.0 | 10.0 | 10.0 | 10.0 | 10.0 |
| Beet Molasses | 74.5 | 75.9 | 76.9 | 78.4 | 81.6 |
| Water | 7.1 | 5.7 | 4.7 | 3.2 | — |
| Calcium Chloride Flake | 8.4 | 8.4 | 8.4 | 8.4 | 8.4 |

*Three different molasses sources had a Brix of 81

Figure 1:
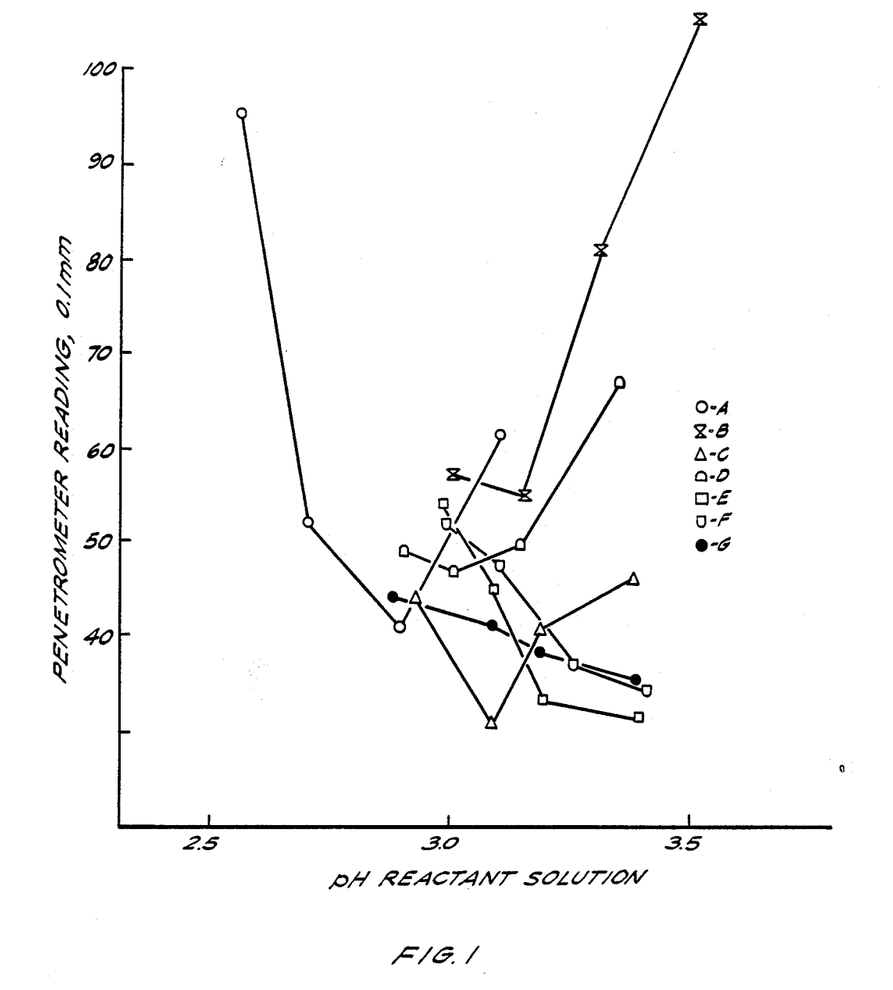
FIG. 1 shows the variation in block hardness with pH for molasses blocks including beet molasses from various sources.

With all the samples of beet molasses evaluated, a definite sharp minimum (hardness maximum) between a pH of from 2.7 to 3.3 is shown.

The hardness ratings were obtained using the "Precision" standard penetrometer commonly used to evaluate the firmness of lubricating greases. (See ASTM D217-68, 134 ff (1978).) Penetration of the sample by the standard weight cone (102.5 grams) is determined after 5 seconds free fall in 0.1 mm units. A hardness of 80, or less, defines a solid, molasses based animal feed supplement, suitable for transporting and handling and acceptable consumption by cattle in a free-choice feeding situation. (Blocks that have hardness values above 100, e.g. 150 or more, tend to be consumed at a rate greater than the desired 1 to 2 lbs/day/ruminant.)

Figure 2:
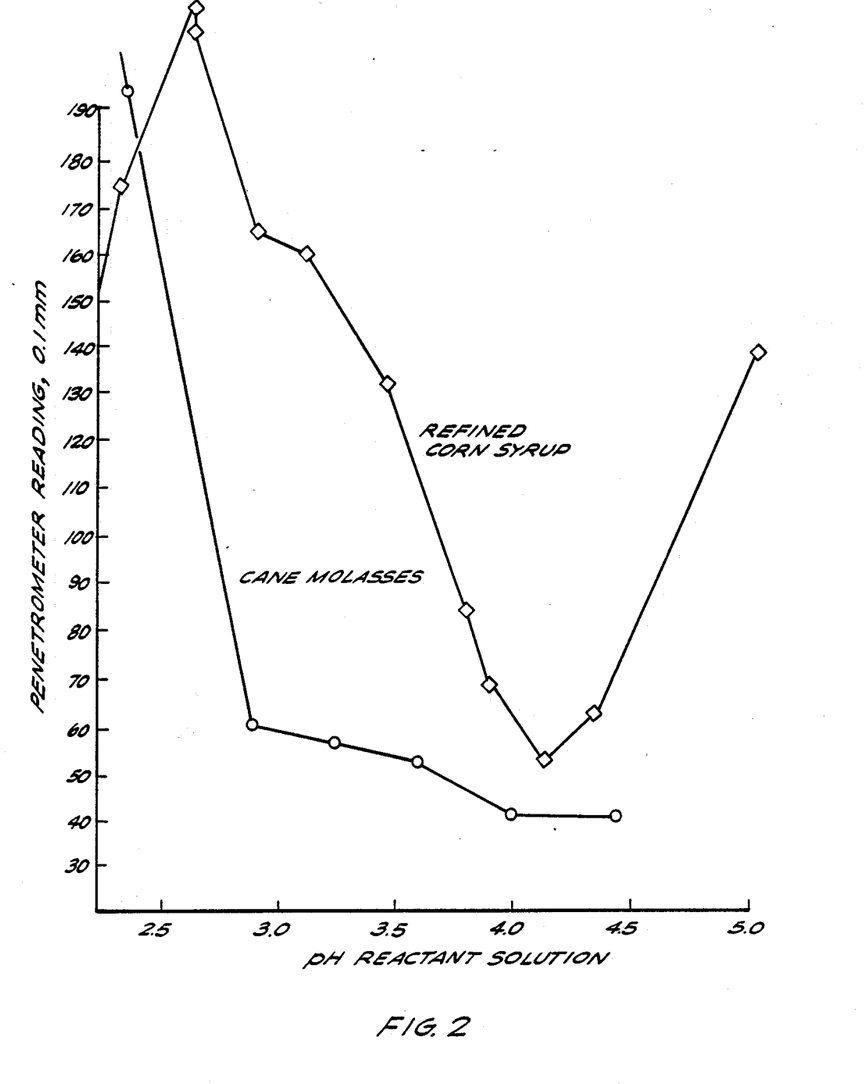
FIG. 2 shows the variation in block hardness with pH for cane molasses and refined corn syrup.

Similarly, the variation of hardness with pH for cane molasses and corn syrup is shown in FIG. 2. Both samples were formulated, as above, with cane molasses and corn syrup replacing the beet molasses. Both the cane molasses block and the corn syrup block show a maximum hardness at a pH of about 4.1. As the pH is increased, beyond 4.1, the hardness of the corn syrup block decreases. (For example, at about pH 4.7 the hardness is greater than 80 penetrometer units. The cane molasses block is still hard at a pH of 4.5; however, the viscosity of the cane molasses reactant solution at a pH greater than 4.5 is sufficiently high to cause mixing problems unless extremely high shear mixers are used, thus defeating the object of obtaining a solid molasses block with simple mixing techniques.)

EXAMPLE 2

Figure 3:
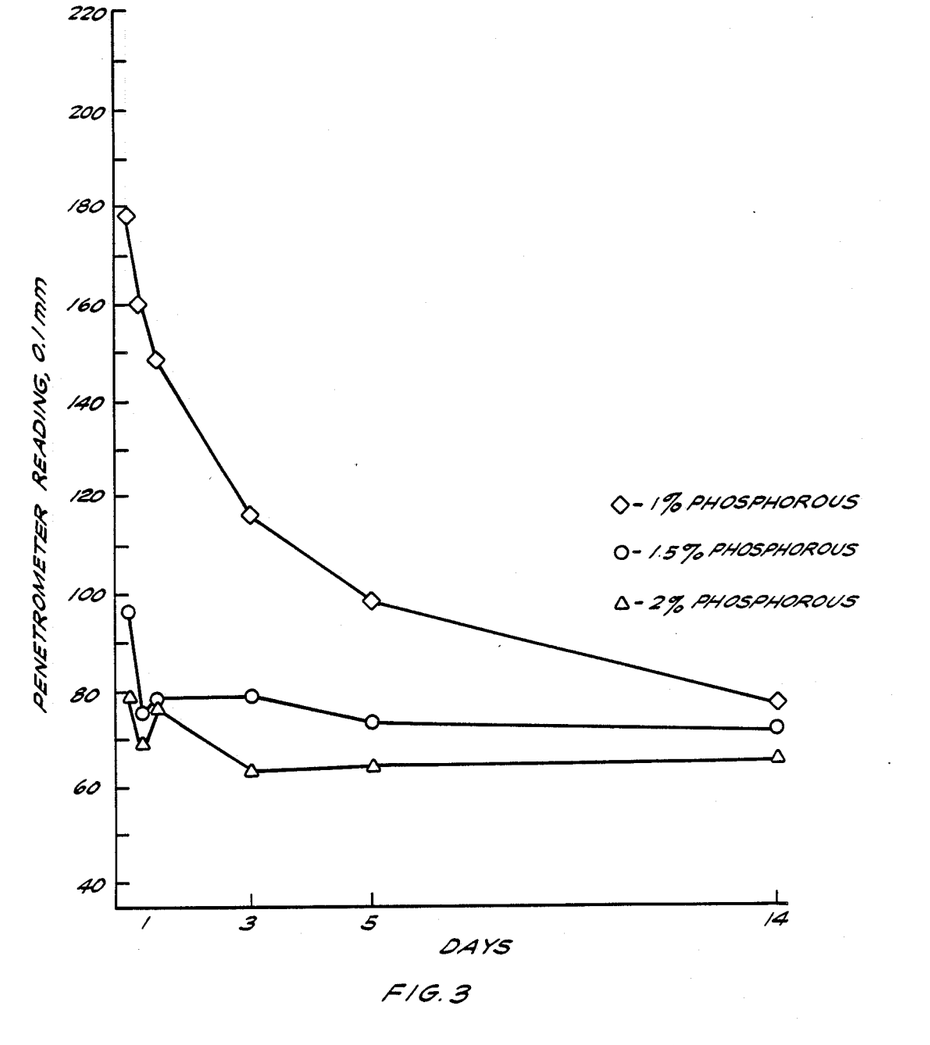
FIG. 3 shows the variation in block hardening rate with phosphorus content.

The following samples are prepared according to Table III below to determine the optimum concentrations of phosphorus for providing a suitable solid, molasses-based animal feed supplement, i.e., having a hardness of 80 or less. As can be determined from the results summarized in FIG. 3, the Samples B and C having 1.5 and 2.0 percent phosphorus, by weight, respectively, quickly harden to 80 or less, while the Sample A having 1.0 percent phosphorus hardens to 100 in about 5 days but requires 14 days to harden to the preferred 80 or lower.

TABLE III

| Ingredient | A | B | C |
|---|---|---|---|
| 50% Urea | 20.8 | 20.8 | 20.8 |
| Cane Molasses (86 BRIX) | 70.0 | 67.9 | 65.8 |
| Salt (NaCl) | 5.0 | 5.0 | 5.0 |
| 75 percent H$_3$PO$_4$ (% Phosphorus) | 4.2(1.0) | 6.3(1.5) | 8.4(2.0) |
| 29 percent Ammonium Hydroxide | 1.05 | 2.72 | 3.74 |
| 50 percent, Calcium Chloride (% Calcium) | 5.6(1.0) | 5.6(1.0) | 5.6(1.0) |

Conditions of Preparation

The above individual ingredients are combined, in order to yield reactant solutions having a pH of about 3.2. After combination the reactant solutions are mixed with a Lightnin Mixer for 1 minute at room temperature and then oven cured at 105° F. (40° C.) The hardness is measured after 1, 3, 5 and 14 day curing periods.

EXAMPLE 3

Example 2 was repeated except that both the concentrations of phosphorus and calcium are varied to determine the concentrations and ratios for obtaining the optimum rate of hardening and ultimate hardness. As shown in Table IV, less than 1.0 weight percent calcium, e.g. 0.5 percent calcium, is insufficient to obtain solid molasses blocks having a hardness of 80 penetrometer units or less even after curing for 14 days at 105° F. Moreover, increasing the calcium concentration from 2.0 to 2.5 weight percent does not substantially increase the rate of hardening or the ultimate hardness of the solid molasses blocks.

Finally, the reactant solutions, comprising 1.5 and 2.0 weight percent calcium and phosphorus, show a substantially increased rate of hardening.

TABLE IV

| | Penetrometer Reading, 0.1 mm units | | | | | |
|---|---|---|---|---|---|---|
| | 8 hrs | 18 hrs | 25 hrs | 67 hrs | 138 hrs | 14 days |
| 1% Phosphorus | | | | | | |
| 0.5% Calcium | 191 | 172 | 167 | 167 | 162 | 150 |
| 1.0% Calcium | 178 | 160 | 148 | 116 | 97 | 76 |
| 1.5% Calcium | 162 | 125 | 98 | 80 | 79 | 74 |
| 2.0% Calcium | 150 | 104 | 95 | 89 | 85 | 84 |
| 2.5% Calcium | 115 | 92 | 102 | 96 | 95 | 94 |
| 1.5% Phosphorus | | | | | | |
| 0.5% Calcium | 143 | 140 | 136 | 133 | 125 | 121 |
| 1.0% Calcium | 96 | 75 | 77 | 78 | 73 | 72 |
| 1.5% Calcium | 87 | 87 | 88 | 85 | 83 | 83 |
| 2.0% Calcium | 87 | 86 | 86 | 89 | 79 | 79 |
| 2.5% Calcium | 85 | 87 | 85 | 84 | 72 | 66 |
| 2.0% Phosphorus | | | | | | |
| 0.5% Calcium | 130 | 124 | 121 | 111 | 110 | 103 |
| 1.0% Calcium | 78 | 68 | 76 | 63 | 64 | 65 |
| 1.5% Calcium | 69 | 75 | 80 | 70 | 71 | 69 |
| 2.0% Calcium | 63 | 71 | 69 | 66 | 63 | 62 |
| 2.5% Calcium | 63 | 74 | 70 | 64 | 63 | 59 |

EXAMPLE 4

Figure 4:
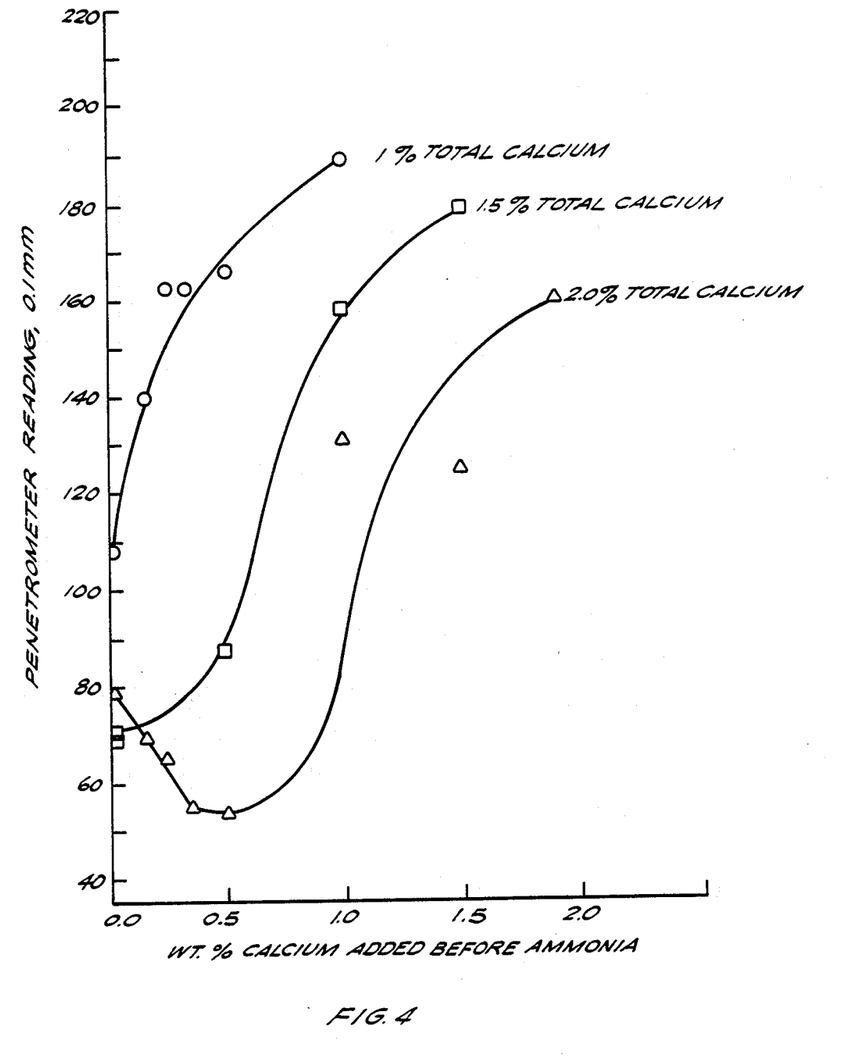
FIG. 4 shows the variation of block hardness with the order of calcium and ammonia addition.

A solution is prepared comprising 20.8 parts of a 50 percent urea solution, 65.8 parts of beet molasses, 5.0 parts salt (NaCl), and 8.4 parts of a 75 percent phosphoric acid solution (to provide 2.0 percent phosphorus, by weight.) To this solution is added 1.9 parts of 29 percent aqueous ammonia and 5.6, 8.4, and 11.2 parts of 50 percent aqueous calcium chloride, in varying increments before and after ammonia, to adjust the pH of the phosphorus-containing molasses solution to 4.0 and determine the order of mixing calcium ion and ammonia with phosphorus-containing molasses to obtain solid molasses blocks of optimum hardness. As shown in FIG. 4, optimum hardness, after curing overnight at 105° F., is obtained when all of the calcium ion is mixed into the phosphorus-containing molasses solution after the pH has been adjusted with ammonia.

EXAMPLE 5

This example compares the hardness obtained by various methods of combining the calcium ion with the orthophosphate. The various solutions in Table V below are prepared and the pH of each phosphorus-containing solution is adjusted to about 4.0 with aqueous ammonia. To the sample designated as P100 is added calcium chloride as a dry flake and as a 50 percent brine to provide 1.0 percent calcium and the resulting reactant solutions are mixed for 5 minutes and 1 minute respectively. The samples designated P75 and Ca 25 are combined at a 3 to 1 wt. ratio, respectively; and the samples designated P50 and Ca 50 are combined at a 1 to 1 wt. ratio. All of the reactant solutions are oven cured for from one to four days at 105° F. The resulting hardness readings are obtained as described above and are given in Table VI below. It is clear that predissolving the calcium in molasses provides a much harder block than mixing the calcium with the phosphorus-containing molasses either as a dry flake or as the 50 percent brine with shear-limited mixing. Moreover, it is clear that mixing equal volumes of phosphorus-containing molasses and molasses containing predissolved calcium obtains the hardest samples. Finally, it will be apparent that since this method relies on mixing equal volumes of molasses solution, the need for accurate measurement as found in the prior art methods for solidifying molasses is not necessary.

TABLE V

| Ingredients | P100 | P75 | P50 | Ca25 | Ca50 |
|---|---|---|---|---|---|
| 50 percent Urea solution | 11.3 | 11.0 | 11.0 | 11.0 | 11.0 |
| Cane Molasses | 77.1 | 75.6 | 71.4 | 72.8 | 78.4 |
| Salt (NaCl) | 5.1 | 5.0 | 5.0 | 5.0 | 5.0 |
| 75 percent phosphoric acid (phosphorus) | 6.5(1.5) | 8.4(2.0) | 12.6(3.0) | — | — |
| 50 percent calcium chloride (calcium) | 5.6(1.0) | — | — | — | — |
| or Calcium chloride | 2.8(1.0) | — | — | 11.2(4.0) | 5.6(2.0) |

TABLE V-continued

| Ingredients (dry) | P100 | P75 | P50 | Ca25 | Ca50 |
|---|---|---|---|---|---|

TABLE VI

Modes of Calcium Incorporation

| | 1 Day | 2 Days | 3 Days | 4 Days |
|---|---|---|---|---|
| Dry Flake | 163 | 138 | — | 137 |
| 50% CaCl₂ Brine | 70 | 68 | — | — |
| P75-Ca25 | 40 | 43 | — | — |
| P50-Ca50 | 31 | — | 29 | — |

EXAMPLE 6

To measure the effect of the temperature of mixing the phosphorus-containing molasses and calcium pre-dissolved in molasses, the solutions of Table VII below are prepared. These solutions are combined at equal weight at the temperatures shown below to obtain a reactant solution containing 1.5 percent phosphorus and 1.0 percent calcium. The reactant solutions are hand mixed for one minute and then oven cured at 105° F. for one and three days. As shown, although all of the reactant solutions harden to a suitable block, i. e., 80 penetometer units or less within one day, the reactant solution that is made up at 110° F. shows a significantly increased hardness after one day and three days as compared to both the reactant solutions made at 46° F. and 72° F. Thus if rapid hardening is desirable, for example, less than one day, mixing at 110° F. is preferred.

TABLE VII

| | Sample | |
|---|---|---|
| Ingredients | A | B |
| 50% Urea solution | 11.6 | 11.6 |
| Cane Molasses | 65.6 | 77.8 |
| Salt | 5.0 | 5.0 |
| 75% Phosphoric Acid | 12.6 | — |
| 29% Ammonia | 5.2 | |
| 50 percent Calcium chloride | — | 5.6 |

| Temperature At Mixing | Block Hardness In Penetrometer Units | |
|---|---|---|
| | 1 Day | 3 Days |
| 46° F. | 63 | 55 |
| 72° F. | 51 | 54 |
| 110° F. | 34 | 29 |

EXAMPLE 7

Figure 5:
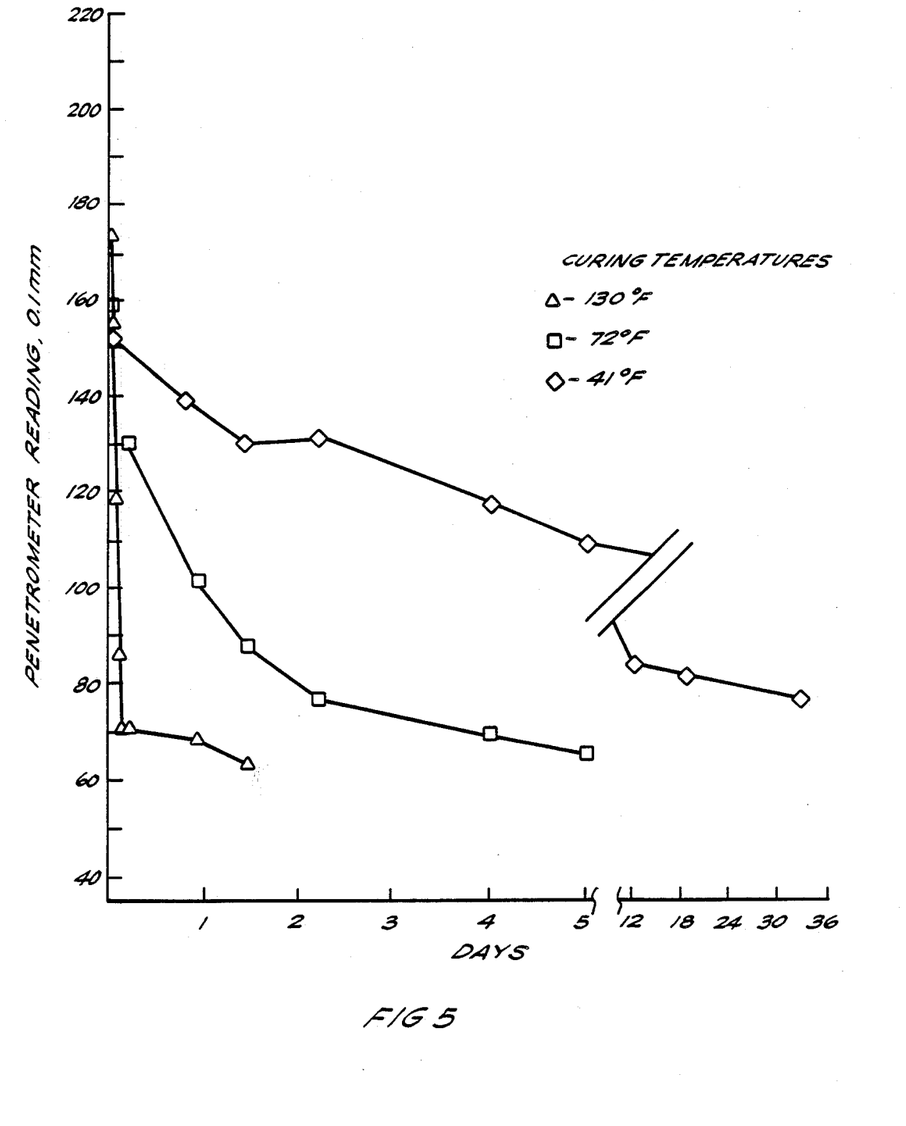
FIG. 5 shows the effect of curing temperature on block hardening rate.

The solutions A and B, described in Table VIII below, are prepared and combined in equal volumes and mixed with a Lightnin Mixer for one minute. Aliquots of this reactant solution are then cured at temperatures of 41° F., 72° F., and 130° F. for varying times. As shown in FIG. 5, the aliquot cured at 41° F. requires 30 days to obtain a hardness of 80 penetrometer units. The aliquot that is cured at a temperature of 130° F. cures to a hardness of less than 80 penetrometer units within a few hours; however, at this temperature a side reaction occurs and thus the resulting product cured for longer periods is unsuitable. At the temperature of 72° F. a suitable hardness of 80 penetrometer units or less is obtained within two days and the resulting product does not suffer from degradation as does the product cured at 130° F. (This example indicates that during cold weather it may be desirable to cure solid molasses blocks of this invention in a heated room to obtain a suitable hardness within a reasonable degree of time. Storage at 105° F. provides rapid curing without significant side reaction.)

TABLE VIII

| | Solutions | |
|---|---|---|
| Ingredients | A | B |
| 50% Urea Solution | 18.7 | 19.8 |
| Cane Molasses | 61.0 | 64.7 |
| Salt (NaCl) | 4.5 | 4.8 |
| 75 percent phosphoric acid | 11.3 | — |
| 50 percent calcium chloride | — | 5.35 |
| Water | — | 5.35 |
| 29% Ammonium Hydroxide | 4.05 | — |

EXAMPLE 8

Solutions comprising 2 percent calcium and 1.5 percent phosphorus, as described in Table IX below, are prepared, by combining the individual ingredients in order, and cured at 105° F., after mixing the combined ingredients for 1 minute with a Lightnin Mixer. It is clear that where a portion of the phosphorus is derived from the ammonium polyphosphate both the rate of hardening and the ultimate hardness is substantially reduced.

TABLE IX

| | Solution | | |
|---|---|---|---|
| Ingredients | A | B | C |
| 50 percent urea solution | 11.4 | 11.4 | 11.4 |
| Cane Molasses | 72.2 | 72.2 | 72.2 |
| Salt (NaCl) | 5.0 | 5.0 | 5.0 |
| 75 percent phosphoric acid | 6.3 | 4.3 | 2.3 |
| Ammonium polyphosphate | 0.0 | 2.0 | 4.0 |
| Water | 2.2 | 2.2 | 2.2 |
| 29 percent ammonium hydroxide to adjust the pH to 4.0 | 2.34 | 1.44 | 0.72 |
| 50 percent calcium chloride | 5.6 | 5.6 | 5.6 |
| Days | Penetrometer Reading | | |
| 1 | 48 | 115 | 181 |
| 2 | 44 | 98 | 174 |
| 7 | 44 | 79 | 146 |
| 8 | 47 | 77 | 144 |
| 11 | 44 | 70 | 138 |
| 14 | 44 | 70 | 141 |

EXAMPLE 9

To solutions comprising 1.5 percent phosphorus (from phosphoric acid) are added varying amounts of phosphorus as polyphosphate. The solutions are combined with 50 percent calcium chloride to provide reactant solutions comprising 1.0 percent calcium. The reactant solutions are mixed and cured as in Example 8. As shown in Table X below, additional phosphorus, in the form of polyphosphate, substantially decreases both the rate of hardening and the ultimate hardness of the resulting solid molasses blocks.

TABLE X

| Ingredient | A | B | C | D | E | F | G |
|---|---|---|---|---|---|---|---|
| | Solution | | | | | | |
| 50 percent urea solution | 20.8 | 20.8 | 20.8 | 20.8 | 20.8 | 20.8 | 20.8 |
| Cane Molasses | 67.9 | 67.9 | 67.9 | 67.9 | 67.9 | 67.9 | 67.9 |
| Salt (NaCl) | 5.0 | 4.9 | 4.5 | 4.9 | 4.5 | 4.9 | 4.5 |
| Phosphoric Acid | 6.3 | 6.3 | 6.3 | 6.3 | 6.3 | 6.3 | 6.3 |
| Sodium tripolyphosphate | — | 0.1 | 0.5 | — | — | — | — |
| Tetrasodium pyrophosphate | — | — | — | 0.1 | 0.5 | — | — |
| Sodium | — | — | — | — | — | 0.1 | 0.5 |

TABLE X-continued

|  | A | B | C | D | E | F | G |
|---|---|---|---|---|---|---|---|
| hexametaphosphate | | | | | | | |
| 29 percent ammonium hydroxide to pH 4.0 | 2.25 | 2.25 | 2.25 | 2.25 | 2.25 | 2.25 | 2.25 |
| 50 percent calcium chloride | 5.6 | 5.6 | 5.6 | 5.6 | 5.6 | 5.6 | 5.6 |
| Days | Penetrometer Reading, mm | | | | | | |
| 1 | 65 | 77 | 126 | 79 | 102 | 87 | 130 |
| 2 | 51 | 54 | 111 | 60 | 91 | 63 | 105 |
| 3 | 55 | — | 92 | — | 89 | — | 91 |
| 4 | 51 | — | 94 | — | 80 | — | 90 |
| 5 | — | 47 | — | 50 | — | 54 | — |
| 7 | 49 | — | 83 | — | 77 | — | 80 |

While particular embodiments of the invention have been described, it will be understood, of course, that the invention is not limited thereto since many obvious modifications can be made, and it is intended to include within this invention any such modification as will fall within the scope of the appended claims.

I claim:

1. A method for providing a solid, molasses-based animal feed supplement comprising:
   (1) mixing under conditions of agitation a first molasses solution, essentially free of added calcium, comprising cane molasses and an orthophosphate compound with a second molasses solution, essentially free of added phosphorus, comprising cane molasses and calcium present substantially in the form of dissolved calcium ions, said first and second solutions containing phosphorus and calcium in sufficient concentrations so that, during said mixing, a reactant solution is produced having a phosphorus concentration of 1 to 2 percent by weight and a calcium concentration of 1 to 2 percent by weight, said reactant solution having a pH between about 4.0 and about 4.5, and substantially all of the calcium present in the reactant solution is in the form of dissolved calcium ions, and
   (2) allowing said reactant solution to harden into a solid, molasses-based animal feed supplement containing calcium and phosphorus each in a concentration of 1 to 2 percent by weight.

2. A process as defined in claim 1 wherein essentially the only calcium, additional to any native calcium in the cane molasses of the second solution, is provided to said second solution in the form of one or more water-soluble calcium compounds.

3. A process as defined in claim 2 wherein phosphorus in said first solution consists essentially of orthophosphates.

4. A process as defined in claim 3 wherein all of said phosphorus in said first solution was added thereto, prior to said mixing, in the form of one or more polyphosphate-free phosphorus compounds.

5. A process as defined in claim 4 wherein said pH is between 4.2 and 4.5.

6. A process as defined in claim 5 wherein said reactant solution, in step (2), hardens to a solid having a hardness value no greater than 34 as measured in 0.1 mm penetrometer units.

7. A process as defined in claim 5 wherein (a) the BRIX value of said cane molasses in said first and second solutions is between 75 and 90, (b) the phosphorus compound consists of orthophosphoric acid, (c) the water-soluble calcium compound consists of calcium chloride, and (d) said reactant solution in step (2) is allowed to harden at a temperature in the range of 75° to 110° F.

8. A process as defined in claim 7 wherein the pH is controlled by adjusting the pH of said first solution with ammonia to a value between 3.0 and 6.0 and wherein essentially combined in step (1) to provide said reactant solution.

9. A process as defined in claim 8 wherein said first and second molasses solution and said reactant solution are substantially free of added calcium sequestrants and precipitants.

10. A process as defined in claim 4 wherein said pH is between 4.1 and 4.5.

11. A process as defined in claim 10 wherein said reactant solution, in step (2), hardens to a solid having a hardness value no greater than 60 as measured in 0.1 mm penetrometer units.

12. A process as defined in claim 11 wherein said first and second molasses solution and said reactant solution are substantially free of added calcium sequestrants and precipitants.

13. A process as defined in claim 12 wherein said reactant solution is allowed to harden at a temperature in the range of 60° to 110° F.

14. A process as defined in claim 13 wherein said pH is controlled by adjusting the pH of said first solution, prior to said mixing, by addition of a water-soluble base thereto.

15. A process as defined in claim 14 wherein the BRIX value of said cane molasses in said first and second solutions is between about 75 and 90.

16. A process as defined in claim 15 wherein said polyphosphate-free phosphorus compound is selected from the group consisting of ammonium phosphate, alkali metal phosphates, orthophosphoric acid, and mixtures thereof.

17. A process as defined in claim 16 wherein, in step (1), the second solution is mixed with the first solution in a volumetric ratio of about ⅓ to about 3 volumes of second solution for each volume of first solution.

18. A process as defined in claim 17 wherein said water-soluble calcium salts are selected from the group consisting of calcium acetate, calcium chloride, calcium propionate, and calcium lignosulfonate.

19. A process as defined in claim 18 wherein said water-soluble calcium salts consist essentially of calcium chloride.

20. A process as defined in claim 19 wherein essentially the only added phosphorus compound in said first molasses solution is orthophosphoric acid.

21. A process as claimed in claim 20 wherein said reactant solution, in step (2), hardens to a solid having a hardness value no greater than 48 as measured in 0.1 mm penetrometer units.

22. A process as defined in claim 21 wherein said water-soluble base is ammonia and the pH of said first solution is between about 3.0 and 6.0.

23. A process as defined in claim 22 wherein the phosphorus content of said reactant solution and the feed supplement is in the range of 1.5 to 2.0 weight percent.

24. A process as defined in claim 23 wherein said reactant solution is allowed to harden to a temperature in the range of 75° to 110° F.

25. A process as defined in claim 24 wherein said first solution further comprises nonprotein nitrogen, and said reactant solution comprises from about 60 to 90 percent by weight cane molasses.

26. A process as defined in claim 25 wherein said reactant solution, in step (2), hardens to a solid having a hardness value no greater than 43 as measured in 0.1 mm penetrometer units.

27. A process as defined in claim 26 wherein said nonprotein nitrogen is urea provided in a concentration of 1 to 15 percent by weight in said reactant solution, and said reactant solution further comprises sodium chloride in a concentration from 1 to 10 percent by weight.

28. A process as defined in claim 27 wherein essentially equal volumes of said first and second molasses solutions are combined in step (1) to provide said reactant solution.

29. A process as defined in claim 28 wherein said reactant solution, in step (2), hardens to a solid having a hardness value no greater than 34 as measured in 0.1 mm penetrometer units.

30. A process as defined in claim 29 wherein said reactant solution is allowed to harden at a temperature of 110° F., and wherein said calcium salt consists of calcium chloride, and said polyphosphate-free phosphorus compound consists of orthophosphoric acid, and wherein said reactant solution consists essentially no starch or fat, and wherein essentially all of the phosphorus and calcium in said reactant solution is derived from said first and second solution, respectively.

31. A process as defined in claim 30 wherein the pH of the first solution is greater than that of the reactant solution, and the calcium content of the reactant solution and the feed supplement is in the range of 1.5 to 2.0 weight percent.

32. A method for providing a solid, molasses-based animal feed supplement comprising:
   (1) mixing under conditions of agitation a first molasses solution, essentially free of added calcium and sulfate ions, comprising cane molasses and an orthophosphate compound with a second molasses solution, essentially free of added phosphorus and sulfate ions, comprising cane molasses and calcium present substantially in the form of dissolved calcium ions, said first and second solutions containing phosphorus and calcium in sufficient concentrations so that, during said mixing, a reactant solution is produced having a phosphorus concentration of 1 to 2 percent by weight and a calcium concentration of 1 to 2 percent by weight, said reactant solution having a pH between about 2.7 and about 4.5, and substantially all of the calcium present in the reactant solution is in the form of dissolved calcium ions, and
   (2) allowing said reactant solution to harden into a solid, molasses-based animal feed supplement containing calcium and phosphorus each in a concentration of 1 to 2 percent by weight.

33. A process as defined in claim 32 wherein essentially the only calcium, additional to any native calcium in the cane molasses of the second solution, is provided to said second solution in the form of one or more water-soluble calcium compounds.

34. A process as defined in claim 33 wherein phosphorus in said first solution consists essentially of orthophosphates.

35. A process as defined in claim 34 wherein all of said phosphorus in said first solution was added thereto, prior to said mixing, in the form of one or more polyphosphate-free phosphorus compounds.

36. A process as defined in claim 35 wherein said pH is between 2.7 and 3.6.

37. A process as defined in claim 35 wherein said pH is between 2.7 and 3.3.

38. A process as defined in claim 37 wherein said reactant solution, in step (2), hardens to a solid having a hardness value no greater than 80 as measured in 0.1 mm penetrometric units.

39. A process as defined in claim 38 wherein said first and second molasses solution and said reactant solution are substantially free of added calcium sequestrants and precipitants.

40. A process as defined in claim 39 wherein the BRIX value of said cane molasses in said first and second solutions is at least 75.

41. A process as defined in claim 40 wherein said reactant solution, in step (2), hardens to a solid having a hardness value no greater than 60 as measured in 0.1 mm penetrometer units.

42. A process as defined in claim 41 wherein said reactant solution is allowed to harden at a temperature in the range of 60° to 110° F.

43. A process as defined in claim 42 wherein said pH is controlled by adjusting the pH of said first solution, prior to said mixing, by addition of a water-soluble base thereto.

44. A process as defined in claim 43 wherein the BRIX value of said cane molasses in said first and second solutions is between about 75 and 90.

45. A process as defined in claim 44 wherein said polyphosphate-free phosphorus compound is selected from the group consisting of ammonium phosphate, alkali metal phosphates, orthophosphoric acid, and mixtures thereof.

46. A process as defined in claim 45 wherein, in step (1), the second solution is mixed with the first solution in a volumetric ratio of about ⅓ to about 3 volumes of second solution for each volume of first solution.

47. A process as defined in claim 46 wherein said water-soluble calcium salts are selected from the group consisting of calcium acetate, calcium chloride, calcium propionate, and calcium lignosulfonate.

48. A process as defined in claim 47 wherein said water-soluble calcium salts consist essentially of calcium chloride.

49. A process as defined in claim 48 wherein essentially the only added phosphorus compound in said first molasses solution is orthophosphoric acid.

50. A process as defined in claim 49 wherein said water-soluble base is ammonia and the pH of said first solution is between about 3.0 and 6.0.

51. A process as defined in claim 50 wherein said reactant solution is allowed to harden at a temperature in the range of 75° to 110° F.

52. A process as defined in claim 51 wherein said first solution further comprises nonprotein nitrogen, and said reactant solution comprises from about 60 to 90 percent by weight cane molasses.

53. A process as defined in claim 52 wherein said nonprotein nitrogen is urea provided in a concentration of 1 to 15 percent by weight in said reactant solution, and said reactant solution further comprises sodium chloride in a concentration from 1 to 10 percent by weight.

54. A process as defined in claim 53 wherein essentially equal volumes of said first and second molasses solutions are combined in step (1) to provide said reactant solution.

55. A process as defined in claim 54 wherein said reactant solution, in step (2), hardens to a solid having a hardness value no greater than 48 as measured in 0.1 mm penetrometer units.

56. A process as defined in claim 55 wherein said reactant solution, in step (2), hardens to a solid having a hardness value no greater than 43 as measured in 0.1 mm penetrometer units.

57. A process as defined in claim 56 wherein said reactant solution, in step (2), hardens to a solid having a hardness value no greater than 34 as measured in 0.1 mm penetrometer units.

58. A process as defined in claim 57 wherein the phosphorus content of said reactant solution and the feed supplement is in the range of 1.5 to 2.0 weight percent.

59. A process as defined in claim 58 wherein said reactant solution is allowed to harden at a temperature of 110° F., and wherein said calcium salt consists of calcium chloride, and said polyphosphate-free phosphorus compound consists of orthophosphoric acid, and wherein said reactant solution contains essentially no starch or fat, and wherein essentially all of the phosphorus and calcium in said reactant solution is derived from said first and second solutions, respectively.

60. A process as defined in claim 59 wherein the pH of the first solution is greater than that of the reactant solution and the calcium content of the reactant solution and the feed supplement is between 1.5 and 2.0 weight percent.

61. A process as defined in claim 35 wherein said pH is between 4.0 and 4.5.

62. A process as defined in claim 61 wherein said pH is between 4.1 and 4.5.

63. A process as defined in claim 62 wherein said reactant solution, in step (2), hardens to a solid having a hardness value no greater than 80 as measured in 0.1 mm penetrometer units.

64. A process as defined in claim 62 wherein said reactant solution, in step (2), hardens to a solid having a hardness value no greater than 60 as measured in 0.1 mm penetrometer units.

65. A process as defined in claim 62 wherein said reactant solution, in step (2), hardens to a solid having a hardness value no greater than 34 as measured in 0.1 mm penetrometer units.

66. A method for providing a solid, molasses-based animal feed supplement consisting essentially of:
(1) mixing under conditions of agitation a first molasses solution comprising cane molasses and an orthophosphate compound with a second molasses solution comprising cane molasses and calcium present substantially in the form of dissolved calcium ions, said first solution containing phosphorus and said second solution containing calcium in sufficient concentrations so that, during said mixing, a reactant solution is produced having a phosphorus concentration of 1 to 2 percent by weight and a calcium concentration of 1 to 2 percent by weight, said reactant solution having a pH between about 4.1 and about 4.5, with essentially all phosphorus in said reactant solution having originally been in said first solution and essentially all calcium in said reactant solution having originally been in said second solution, and
(2) allowing said reactant solution to harden into a solid, molasses-based animal feed supplement containing calcium and phosphorus each in a concentration of 1 to 2 percent by weight.

67. A method for providing a solid, molasses-based animal feed supplement consisting essentially of:
(1) mixing under conditions of agitation a first molasses solution comprising cane molasses and an orthophosphate compound with a second molasses solution comprising cane molasses and calcium present substantially in the form of dissolved calcium ions, said first and second solutions containing phosphorus and calcium in sufficient concentrations so that, during said mixing, a reactant solution is produced having a phosphorus concentration of 1 to 2 percent by weight and a calcium concentration of 1 to 2 percent by weight, said reactant solution being substantially free of added sulfate ions and having a pH between about 2.7 and about 4.5, with essentially all phosphorus in said reactant solution having originally been in said first solution and essentially all calcium in said reactant solution having originally been in said second solution, and
(2) allowing said reactant solution to harden into a solid, molasses-based animal feed supplement containing calcium and phosphorus each in a concentration of 1 to 2 percent by weight.

68. A method for producing a solid, molasses-based animal feed supplement consisting essentially of:
(1) producing a reactant molasses solution having a pH of 4 and containing 2 weight percent phosphorus and 2 weight percent calcium by:
(a) adjusting the pH of a molasses solution consisting essentially of beet molasses and orthophosphoric acid with aqueous ammonia, said aqueous ammonia being added after at least some but no more than 25% of the calcium ion needed to produce a calcium concentration of 2 weight percent calcium in said reactant solution has been mixed into said molasses solution;
(b) then adding the remaining 75% of the calcium ion needed to produce said 2 weight percent calcium to said reactant solution, said calcium ion in both steps 1(a) and 1(b) being supplied in a form consisting essentially of water-soluble calcium chloride;
(2) agitating said reactant solution; and
(3) then allowing said reactant solution to harden into a molasses block containing 2 weight percent phosphorus and 2 weight percent calcium and having a hardness value below about 80 as measured in 0.1 mm penetrometer units.

69. A method for making a solid, animal feed supplement, the method comprising the steps of:
(a) mixing a first solution with a second solution to form a reactant solution having a pH within a range of about 2.7 to 4.5; and
(b) allowing the reactant solution to harden into the solid, animal feed supplement,
wherein the first solution comprises a water-soluble phosphate compound, the second solution comprises a water-soluble calcium compound, at least one of the first and second solutions further comprises a sugar source, the reactant solution comprises at least one metal, and substantially all the metals in the reactant solution consist essentially of dissolved metal ions, the phosphate compound and the calcium compound being present in the reactant solution in sufficient amount so that (I) phosphorus comprises at least 1 weight percent of the reactant solution and (II) total calcium ions from (A) the water-soluble calcium compound and (B) any native calcium ion content of the sugar source comprise at least about 1 weight percent of the reactant solution.

70. The method of claim 69 wherein the metal ions are selected from the group consisting of calcium, sodium, and potassium ions.

71. The method of claim 69 wherein the metal ions comprise calcium ions.

72. The method of claim 69 wherein the reactant solution has a pH of 2.7 to 3.3.

73. The method of claim 69 wherein the first solution further comprises a sugar source.

74. The method of claim 69 wherein the second solution further comprises a sugar source.

75. The method of claim 69 wherein the first and second solutions further comprises the sugar source.

76. The method of claim 69 wherein the sugar source is an aqueous sugar solution.

77. The method of claim 69 wherein the sugar source is selected from the group consisting of sugar syrups and molasses.

78. The method of claim 69 wherein the sugar source is molasses having a solids content of about 60 to about 90 BRIX.

79. The method of claim 78 wherein the molasses has a solids content of 75 to about 90 BRIX.

80. The method of claim 69 wherein the sugar source is molasses.

81. The method of claim 80 wherein the molasses is selected from the group consisting of cane molasses, beet molasses, corn molasses, wood sugar molasses, and citrus molasses.

82. The method of claim 80 wherein the molasses is selected from the group consisting of cane molasses and beet molasses.

83. The method of claim 69 wherein the phosphorus comprises about 1 to about 2 weight percent of the reactant solution.

84. The method of claim 69 wherein the phosphorus comprises 1.5 to about 2 weight percent of the reactant solution.

85. The method of claim 69 wherein the total calcium ions comprise about 1 to about 2 weight percent of the reactant solution.

86. The method of claim 69 wherein the total calcium ions comprises about 1.5 to about 2 weight percent of the reactant solution.

87. The method of claim 69 wherein the sugar source comprises a native content of calcium ions.

88. The method of claim 69 further comprising the step of adding at least one additional ingredient to the reactant solution prior to the reactant solution hardening into the solid, animal feed supplement.

89. The method of claim 88 wherein the additional ingredient is selected from the group consisting of sodium chloride, protein meal, nonprotein nitrogen, fat, vitamins, trace minerals, medicants, emulsifying agents, and drugs.

90. The method of claim 69 wherein at least one of the first and second solutions further comprises at least one additional ingredient.

91. The method of claim 69 where the phosphate compound is selected from the group consisting of phosphoric acid, ammonium and alkali metal phosphates, polyphosphoric acid, and mixtures thereof.

92. The method of claim 69 wherein the phosphate compound is orthophosphoric acid.

93. The method of claim 69 wherein the calcium compound is selected from the group consisting of calcium chloride, calcium acetate, calcium propionate, and calcium lignosulfonate.

94. The method of claim 69 wherein the calcium compound is calcium chloride.

95. The method of claim 69 wherein the first solution is substantially devoid of calcium ions from a source other than the sugar source.

96. The method of claim 69 further comprising the step of adjusting the pH of the reactant solution to within the range of about 2.7 to 4.5.

97. The method of claim 69 further comprising the step of adjusting the pH of the first solution to a pH level sufficiently high so that when the first and second solutions are mixed, the reactant solution has a pH with the range of about 2.7 to 4.5.

98. The method of claim 97 wherein the pH of the first solution is adjusted with ammonia.

99. The method of claim 69 further comprising the step of agitating the reactant solution at a temperature of 60° to about 110° F.

100. The method of claim 99 wherein the reaction solution is agitated at a temperature of about 75° to about 110° F.

101. The method of claim 69 wherein the first and second solutions comprise molasses.

102. The method of claim 101 wherein substantially equal volumes of the first and second solutions are mixed to form the reactant solution.

103. The method of claim 69 wherein the solid, animal feed supplement has a hardness of less than about 80 in 0.1 millimeter penetrometer units.

104. The method of claim 69 wherein substantially all the metals in the reactant solution consist of dissolved metal ions.

105. A method for making a solid, animal feed supplement, the method comprising the steps of:
(a) mixing a first solution with a second solution to form a reactant solution having a pH within a range of about 2.7 to 4.5; and
(b) allowing the reactant solution to harden into the solid, animal feed supplement,
wherein the first solution comprises a water-soluble phosphate compound and molasses, the second solution comprising a water-soluble calcium compound and molasses, the solid, animal feed supplement has a hardness of less than about 80 to 0.1 millimeter penetrometer units, the reactant solution comprises at least one metal, and substantially all the metals in the reactant solution consist essentially of dissolved metal ions, the phosphate compound and the calcium compound being present in the reactant solution in a sufficient amount so that (I) phosphorus comprises at least 1 weight percent of the reactant solution and (II) total calcium ions from (A) the calcium compound and (B) any native calcium ion content of the molasses comprise at least about 1 weight percent of the reactant solution.

106. The method of claim 105 wherein the reactant solution has a pH of about 2.7 to 3.3.

107. The method of claim 105 wherein the reactant solution has a pH of about 4 to about 4.5.

108. The method of claim 105 wherein the solid, animal feed supplement has a hardness of less than about 60 in 0.1 millimeter penetrometer units.

109. The method of claim 105 wherein the solid, animal feed supplement has a hardness of less than about 48 in 0.1 millimeter penetrometer units.

110. The method of claim 105 wherein the solid, animal feed supplement has a hardness of less than about 34 in 0.1 millimeter penetrometer units.

111. The method of claim 105 wherein the molasses in the first and second solutions has a solids content of about 60 to 90 BRIX, the phosphorus comprises 1 to about 2 weight percent of the reactant solution, the total calcium ions comprise about 1 to about 2 weight percent of the reactant solution, and the method further comprises the step of agitating the reactant solution at a temperature of 60° to about 100° F.

112. The method of claim 105 wherein the molasses in the first and second solutions has a solids content of 75 to about 90 BRIX, the phosphorus comprises 1.5 to about 2 weight percent of the reactant solution, the total calcium ions comprise about 1.5 to about 2 weight percent of the reactant solution, the phosphate compound is orthophosphoric acid, the calcium compound is calcium chloride, and the method further comprises the step of agitating the reactant solution at a temperature of about 75° to about 110° F.

113. A method of making a solid, animal feed supplement, the method comprising the steps of:
  (a) mixing a first solution with a water-soluble calcium compound to form a reactant solution having a pH within a range of about 2.7 to 4.5; and
  (b) allowing the reactant solution to harden into the solid, animal feed supplement,
wherein the first solution comprises a water-soluble phosphate compound and a sugar source, the reactant solution comprises at least one metal, and substantially all the metals in the reactant solution consist essentially of dissolved metal ions, the phosphate compound and the calcium compound being present in the reactant solution in a sufficient amount so that (I) phosphorus comprises at least 1 weight percent of the reactant solution and (II) total calcium ions from (A) the water-soluble calcium compound and (B) any native calcium ion content of the sugar source comprise at least about 1 weight percent of the reactant solution.

114. A method for making a solid, animal feed supplement, the method comprising the steps of:
  (a) mixing a first solution with a second solution to form a reactant solution having a pH within a range of about 2.7 to 4.5; and
  (b) allowing the reactant solution to harden into the solid, animal feed supplement,
wherein the first solution comprises a water-soluble phosphate compound, the second solution comprises a water-soluble calcium compound, at least one of the first and second solutions further comprises a sugar source, the reactant solution comprises at least one metal, and substantially all the metals in the reactant solution are derived from water-soluble, metal-containing compounds, the phosphate compound and the calcium compound being present in the reactant solution in a sufficient amount so that (I) phosphorus comprises at least 1 weight percent of the reactant solution and (II) total calcium ions from (A) the water-soluble calcium compound and (B) any native calcium ion content of the sugar source comprise at least about 1 weight percent of the reactant solution.

115. A method for making a solid, animal feed supplement, the method comprising the steps of:
  (a) mixing a first solution with a second solution to form a reactant solution (i) substantially devoid of a metal oxide and (ii) having a pH within a range of about 2.7 to 4.5; and
  (b) allowing the reactant solution to harden into the solid, animal feed supplement,
wherein the first solution comprises a water-soluble phosphate compound, the second solution comprises a water-soluble calcium compound, at least one of the first and second solutions further comprises a sugar source, the phosphate compound and the calcium compound being present in the reactant solution in a sufficient amount so that (I) phosphorus comprises at least 1 weight percent of the reactant solution and (II) total calcium ions from (A) the water-soluble calcium compound and (B) any native calcium ion content of the sugar source comprise at least about 1 weight percent of the reactant solution.

116. The method of claim 115 wherein the reactant solution comprises at least one metal, and substantially all the metals in the reactant solution consist essentially of dissolved metal ions.

117. The method of claim 116 wherein substantially all the metals in the reactant solution consist of dissolved metal ions.

118. The method of claim 115 wherein the reactant solution has a pH of 2.7 to 3.3.

119. The method of claim 115 wherein the first solution further comprises a sugar source.

120. The method of claim 115 wherein the second solution further comprises a sugar source.

121. The method of claim 115 wherein the first and second solutions further comprises the sugar source.

122. The method of claim 115 wherein the phosphorus comprises about 1 to about 2 weight percent of the reactant solution.

123. The method of claim 115 wherein the phosphorus comprises 1.5 to about 2 weight percent of the reactant solution.

124. The method of claim 115 wherein the total calcium ions comprise about 1 to about 2 weight percent of the reactant solution.

125. The method of claim 115 wherein the total calcium ions comprises about 1.5 to about 2 weight percent of the reactant solution.

126. The method of claim 115 wherein the solid, animal feed supplement has a hardness of less than about 80 in 0.1 millimeter penetrometer units.

* * * * *

UNITED STATES PATENT AND TRADEMARK OFFICE
CERTIFICATE OF CORRECTION

PATENT NO. : 4,963,371

DATED : October 6, 1990

INVENTOR(S) : Alex E. Miller

It is certified that error appears in the above-identified patent and that said Letters Patent is hereby corrected as shown below:

Column 16, line 6, after "essentially" insert -- equal volumes of said first and second molasses solutions are --.

Signed and Sealed this

Twenty-fifth Day of February, 1992

Attest:

HARRY F. MANBECK, JR.

*Attesting Officer*    *Commissioner of Patents and Trademarks*